United States Patent [19]

Palmer

[11] Patent Number: 5,757,551

[45] Date of Patent: May 26, 1998

[54] BEAM SPLITTER FOR AN OPTICAL COLLIMATOR ASSEMBLY

[75] Inventor: Gary Lynn Palmer, Vinton, Va.

[73] Assignee: ITT Industries, Inc., White Plains, N.Y.

[21] Appl. No.: 779,798

[22] Filed: Jan. 7, 1997

[51] Int. Cl.[6] .............. G02B 27/14; G02B 7/02; G02B 23/00; G02B 27/02

[52] U.S. Cl. .............. 359/629; 359/819; 359/407; 359/482

[58] Field of Search .............. 359/636, 407, 359/482, 629, 641, 819, 822, 813

[56] References Cited

U.S. PATENT DOCUMENTS

| | | | |
|---|---|---|---|
| 1,240,905 | 9/1917 | Troppman | 359/482 |
| 1,696,739 | 12/1928 | Treleaven | 359/636 |
| 1,840,878 | 1/1932 | Abrams | 359/482 |
| 2,559,698 | 7/1951 | Bahre | 359/482 |
| 4,178,072 | 12/1979 | Rogers | 359/482 |
| 4,196,966 | 4/1980 | Malis | 359/482 |
| 4,302,764 | 11/1981 | Fang et al. | 357/23 |
| 4,727,309 | 2/1988 | Vajdic et al. | 323/315 |
| 5,223,974 | 6/1993 | Phillips et al. | 359/641 |
| 5,347,397 | 9/1994 | Nelson et al. | 359/629 |
| 5,579,158 | 11/1996 | Padula | 359/482 |

*Primary Examiner*—David C. Nelms
*Assistant Examiner*—Ricky Mack
*Attorney, Agent, or Firm*—Plevy & Associates

[57] ABSTRACT

A beam splitter device is disclosed for a collimator assembly which includes a housing having optics to collimate light. The beam splitter includes a base member having a tent-like structure which includes two inclined surfaces. A mirror element is supported by each of the inclined surfaces and a mechanism is included for securing the beam splitter to the housing.

20 Claims, 5 Drawing Sheets

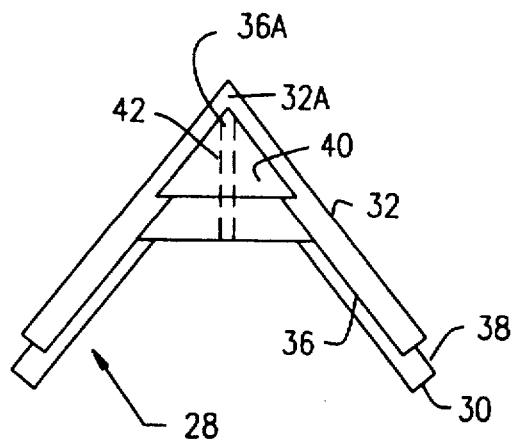
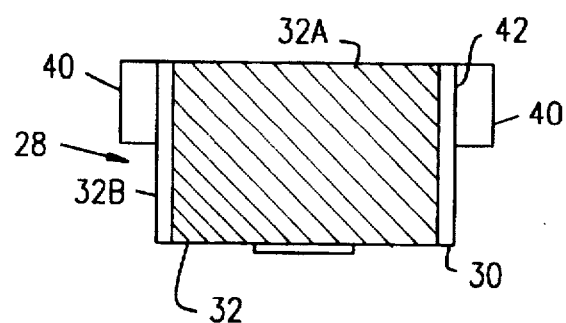
FIG. 5A
FIG. 5B
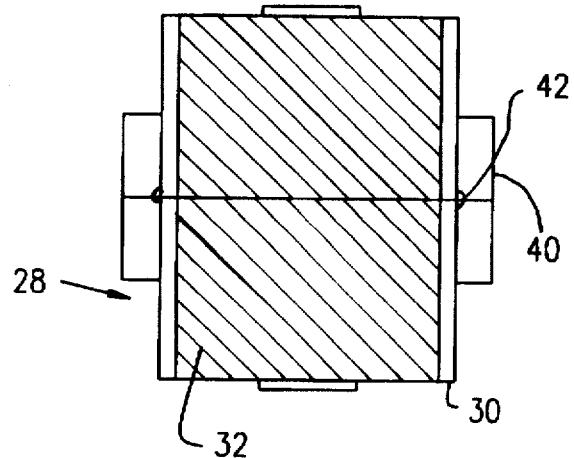
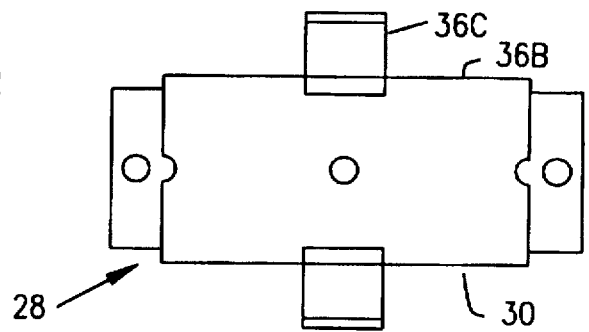
FIG. 5C
FIG. 5D

BEAM SPLITTER FOR AN OPTICAL COLLIMATOR ASSEMBLY

BACKGROUND OF THE INVENTION

1. Field of the Invention

The present invention relates generally to optical devices, and more particularly to a light weight and inexpensive beam splitter for an optical collimator assembly.

2. Description of the Prior Art

Many optical devices, such as some microscopes, telescopes and night vision devices, are viewed with binocular vision but have only a single objective lens arrangement. When a single source image is viewed with binocular vision, the light from the image must obviously be divided into separate corresponding optical outputs that can be viewed simultaneously. Traditionally, the division of a single source image into two corresponding binocular images has been accomplished by utilizing a collimator lens assembly.

Traditionally, a collimator is an optical apparatus for producing parallel rays of light. A rudimentary form consists of a converging lens, at one focal point of which is placed a small source of light. The source of light is usually a pinhole or narrow slit from which the light is caused to emanate. Rays diverging from this focal point emerge from the objective lens in a parallel beam, in accordance to the definition of "focal point". The slit or other source, as viewed through the collimator, appear as though located at an infinite distance. The collimator lens assembly therefore re-images the source image at a substantially infinite conjugate.

Consequently, the collimated light from the re-imaged source image can be split equally, without distortion or parallax, and directed into each of the eyepiece assemblies for viewing. The eyepiece or ocular assemblies are configured to receive collimated light from the collimator lens assembly and are sized and located to share light beam sections included within the collimator exit pupil.

Referring to FIG. 1, there is shown a schematic diagram of the optics for the Model AN/PVS-7B night vision goggles apparatus 10 disclosed in U.S. Pat. No. 5,223,974, to Phillips et al, issued on Jun. 29, 1993, which is sold by International Telephone and Telegraph, Inc., the assignee herein. The shown night vision apparatus 10 works by accepting visible and infrared, or near infrared light, through an objective lens assembly 12 and focusing that light onto an image intensifier tube assembly 14. The image intensifier tube 14 converts the input light to a visible image that can be viewed by an observer through the eyepiece assemblies 16, 18. In night vision applications the devices provide an image utilizing a relatively narrow spectral range of light wavelengths.

The shown night vision apparatus 10 has only one objective lens assembly 12, yet the image produced is viewed through two eyepiece assemblies 16, 18, one for each eye of the observer. As such, it is necessary to re-image the output image of the image intensifier tube 14 in a manner such that two output images are created, and binocular vision may be employed.

In the shown prior art system, two output images are created by the use of a collimator assembly 20 that includes a "bifurcating" mirror 22 which functions as a beam splitter. The optics of the collimator assembly 20 uses the output surface 24 of the image intensifier tube assembly 14 as its object, and re-images the output surface 24 at infinity in order to present an infinity conjugate object to the eyepiece assemblies 16, 18. By re-imaging the output surface 24 of the image intensifier tube assembly 14 to an infinity conjugate, the collimated light exiting the collimator assembly 20 may be split into two images (one ultimately for each eye) by the "bifurcating" mirror 22.

The "bifurcating" mirror 22 reflects light from only half of the optics of the collimator assembly 20 (collimator lens output pupil) into each eyepiece assembly 16, 18. Since the output surface 24 of the image intensifier tube 14 is re-imaged at infinity, binocular vision is easily utilized by a simple splitting of the collimated light and directing the light to separate eyepiece assemblies 16, 18. To avoid vignetting of light from the periphery of the intensifier tube face, it is necessary to place the bifurcating mirror 22 in close proximity to the output surface of collimator lenses (collimator output pupil) and the image of the eyepiece assembly pupil ("matched pupils"). Thus, the vignetting of light is also reduced by placing each eyepiece assembly 16, 18 in close proximity to the bifurcating mirror 22. The mirror must be equal to or larger in size than the eyepiece pupil.

An example of the previously described prior art collimator assembly 22 is shown in FIG. 2. The collimator assembly 20 includes a cylindrical housing 21 including the optics that collimates the light and a bifurcating mirror 22 which acts as a beam splitter. The bifurcating mirror 22 is secured to the front of the housing 21 by a metal clamp 24 and screws 26 as shown. How the clamp 24 and screws are configured is more clearly shown in FIG. 3, which is a front view of the collimator assembly 20.

A drawback with the collimator assembly 20 relates to the bifurcating mirror 22. The bifurcating mirror 22 is often made of a solid piece of glass which can be relatively expensive and add a significant amount of weight to the collimator assembly 20. Also, the use of the clamp 24 for securing the bifurcating mirror 22 to the housing 21 adds further expense and weight to the assembly 20.

It is therefore, an object of the present invention, to provide an improved beam splitter device which enables the weight and cost of an optical collimator assembly to be reduced.

SUMMARY OF THE INVENTION

A beam splitter device is disclosed for a collimator assembly which includes a housing having optics to collimate light. The beam splitter includes a base member having a tent-like structure which includes two inclined surfaces. A mirror element is supported by each of the inclined surfaces and means for securing the beam splitter to the housing is also included.

It is also disclosed that the securing means is either one of two configurations. A first configuration includes screws which extend through bores included in side flanges. While a second configuration includes flanges extending outward from a front portion of the housing, each flange having a notch extending therethrough and detentes extending outward from the side surfaces of the base members. The base member is disposed between the flanges, while the notches are disposed in the slots thereby securing the base member to the housing.

BRIEF DESCRIPTION OF THE DRAWING

The above objects, further features and advantages of the present invention are described in detail below in conjunction with the drawings, of which:

FIG. 5A is a front view of the beam splitter of the collimator assembly of FIG. 4;

FIG. 5B is a side view of the beam splitter of the collimator assembly of FIG. 4;

FIG. 5C is a top view of the beam splitter of the collimator assembly of FIG. 4;

FIG. 5D is a bottom view of the beam splitter of the collimator assembly of FIG. 4;

DETAILED DESCRIPTION OF THE DRAWING

Figure 1:
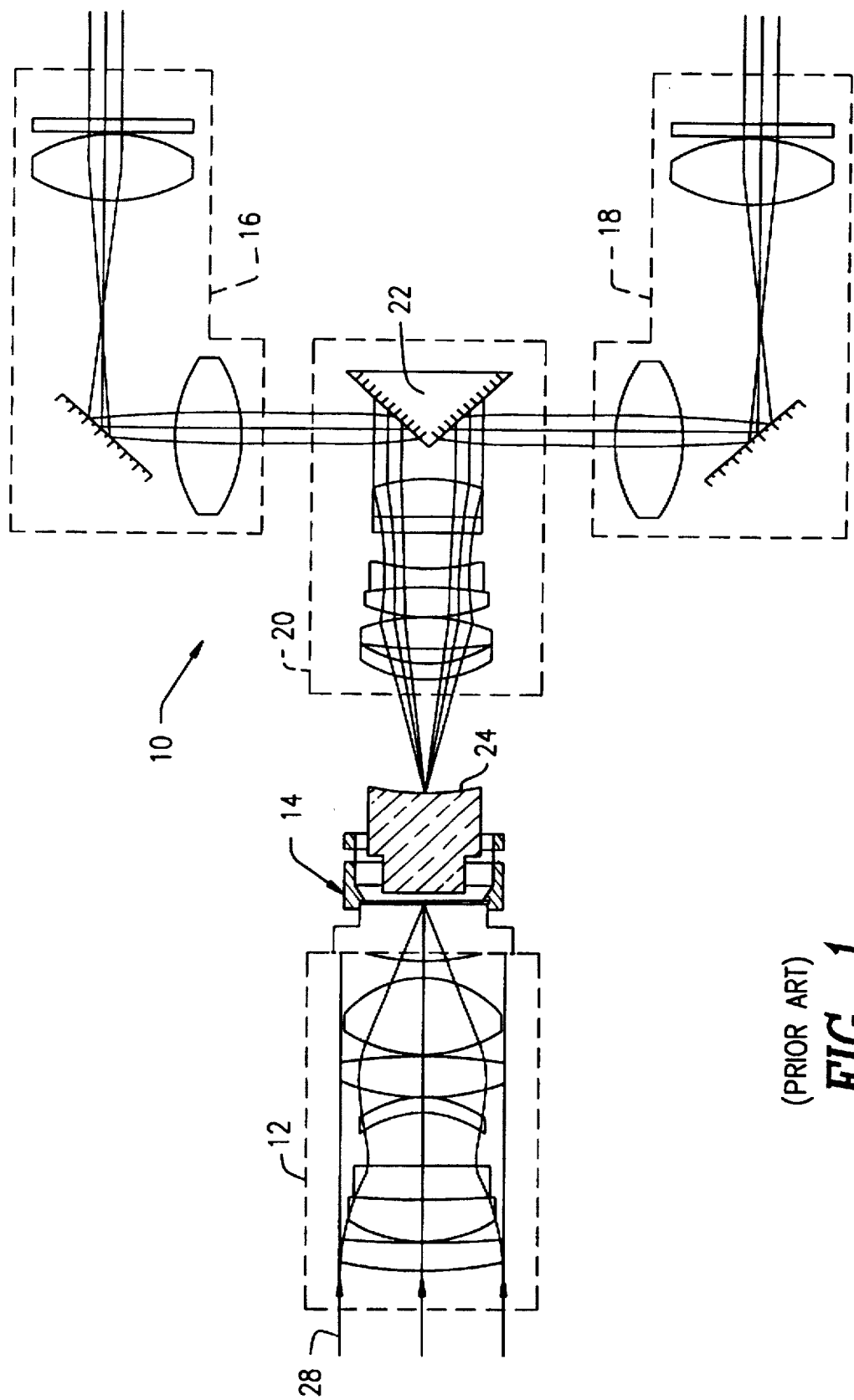
FIG. 1 is a schematic diagram of the optics for the Model AN/PVS-7B night vision goggles apparatus.
Figure 2:
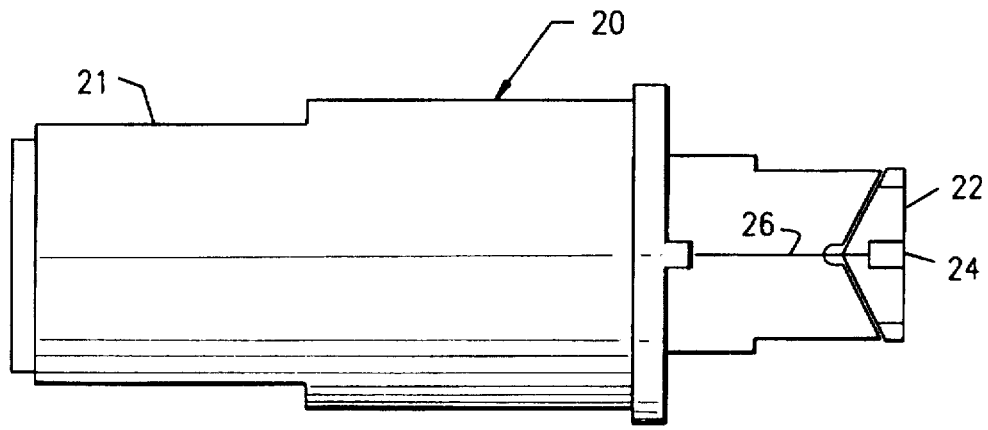
FIG. 2 is a side view of a prior art collimator assembly.
Figure 3:
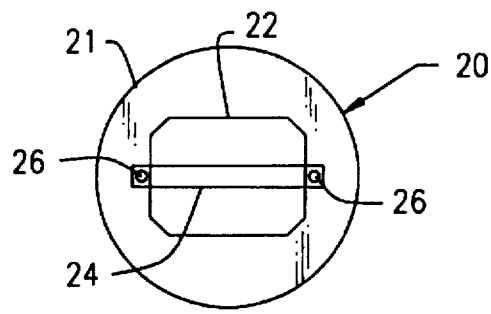
FIG. 3 is a front view of a prior art collimator assembly.

As previously described in conjunction with FIG. 1, prior art collimator assemblies 20 often include a cylindrical housing 21 that contain the optics for collimating the light and a bifurcating mirror 22 which acts as a beam splitter. The bifurcating mirror 22 is secured to the front of the housing 21 by a separate metal clamp 24 and screws 26 as shown. Since the bifurcating mirror 22 is often made of a solid wedge of glass, significant weight and cost is added to the collimator assembly 20. The use of the clamp 24 for securing the bifurcating mirror 22 to the housing 21 also adds additional cost and weight.

In view of the above described problems, the present invention is directed toward an improved beam splitter which can substantially reduce the cost and weight of conventional collimator assemblies. This accomplished by providing a structure that does not require the use of a solid wedge of glass along with a separate clamp for securing the device to the housing.

Figure 4:
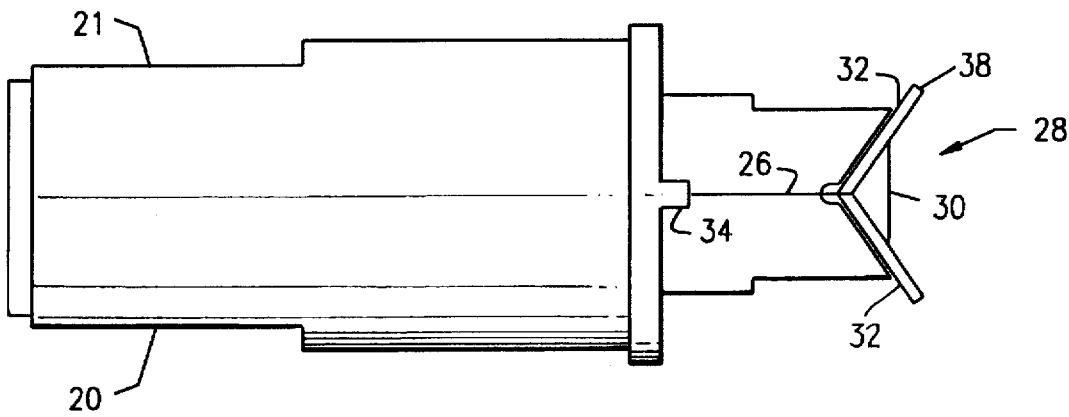
FIG. 4 is a side view of one embodiment of the collimator assembly according to the present invention.

Referring to FIG. 4, a side view of one embodiment of the collimator assembly according to the present invention is shown. The collimator assembly 20 also includes a cylindrical housing 21 having the optics for collimating the light. However, the present invention differs in that a solid wedge of glass is not required nor is the additional clamp. In the present invention, the beam splitter 28 includes a base member 30 and two mirror elements 32, which will be described in detail later.

The mirror elements 32 are supported within the base 30 as shown in order to provide reflective surfaces at the appropriate angles enabling light to be reflected in opposite directions with respect to the length of the collimator assembly 20. This enables light to be reflected to each eyepiece assembly as previously described in the prior art section. The beam splitter 28 is secured to the housing 21 by screws 26 as shown. As can be seen, the screws 26 pass through the base 30 and then are secured within threaded bores 34 included in the housing 21.

Referring to FIG. 5A, there is shown a front view of the beam splitter of the collimator assembly of FIG. 4. As previously described, the beam splitter 28 includes a base member 30 and two mirror elements 32. The base member 30 has a hollow tent-like structure, while the mirror elements 32 are planar-type members.

The base 30 includes to inclined surfaces 36 which extend upward and merge together to form approximately a ninety degree angle 36A. The inclined surfaces 36 extend downward forming lips 38 which extend outward transversely with respect to the inclined surfaces 36. The inclined surfaces 36 along with the lips 38 support the mirror elements 32 when placed within the base 30. The lips 38 also prevent longitudinal movement of the mirror elements 32 when the entire beam splitter 28 is secured to the housing 21 as shown in FIG. 4.

Still referring to FIG. 5A, the base 30 also includes side flanges 40 which are of a triangular configuration. The side flanges 40 are utilized to prevent lateral movement of the mirror elements 32 when placed within the base 30. When the mirror elements 32 are placed within the base 30, the side edges of the mirror elements 32 contact the inner surface of the flanges 40 and thus prevent any lateral movement. The flanges 40 also include bores 42 which extend longitudinal therethrough as shown. The bores 42 enable screws to pass through when the beam splitter 28 is secured to the housing as previously described.

As can be seen, the mirror elements 32 have upper edges 32A which are bevelled. The bevelled edges 32A provide the minimal amount of space between the mirror elements 32 when supported within the base 30. This ensures that the mirror elements 32 reflect a majority of the light. Both the base 30 and mirror elements 32 are preferably fabricated from a plastic material. These elements 30,32 being fabricated from plastic material contributes to both the low cost and weight of the present invention.

Referring to FIGS. 5B & 5C, it can be seen that the side flanges 40 extend outward from the sides of the base 30. The mirror elements 32 are preferably fabricated by utilizing a layer of reflective material 32A which is encased in a plastic material 32B. The type of material utilized for the reflective layer 32A can include such materials as Aluminum, Silver or Chromium.

Referring to FIG. 5D, a bottom view of the beam splitter of the collimator assembly of FIG. 4 is shown. As can be seen, the inclined surfaces 36 include an upper portion 36B and a lower portion 36C, wherein the upper portion 36B has a width which is greater than the lower portion 36C. Further, it can be seen that the base 30 is hollow between the lower portions 36C. Such a structure provides further weight and cost reductions since less material is required for these portions of the base 30. The base 30 also has an aperture 54 which extends through a center portion.

Figure 6:
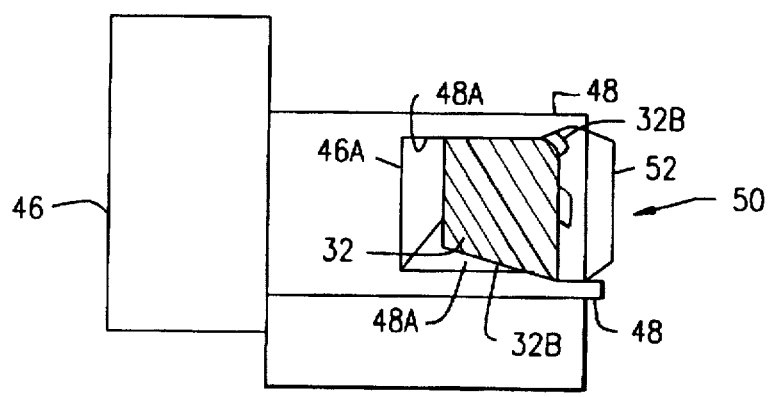
FIG. 6 is a side view of another embodiment of the collimator assembly according to the present invention.

Referring to FIG. 6, a side view of another embodiment of the collimator assembly according to the present invention is shown. This embodiment 44 is similar to the previously described embodiment since it includes a beam splitter 50 secured to a housing 46. However, this embodiment differs in some respects with regard to the housing 46 and base member 52. The mirror elements 32 utilized in this embodiment 44 are exactly the same as in the previously described embodiment.

In the present embodiment 44, the housing 46 differs in its shape since it is not perfectly cylindrical, which will be described in detail later. This difference in shape enables the collimator assembly 46 to be integrally formed within an entire optical bed. However, the housing 46 still contains the optics for collimating the light. The housing further differs in that it includes a pair of flat flanges 48 which extend outward from the front portion of the housing 46A, wherein the flanges 48 are substantially parallel to each other. These flanges 48 are utilized to secure the beam splitter So to the housing 46 as shown.

The flanges 48C are also utilized to prevent lateral movement of the mirror elements 32. When the beam splitter 50 is secured to the housing 46 as shown, the side edges of the mirror elements 32B contact the inner surfaces of the flanges 48A and thus prevent any lateral movement. This function of the flanges 48 eliminates the need for the mounting member 50 to have side flanges for preventing such lateral movement as described in the previous embodiment.

Figure 7A:
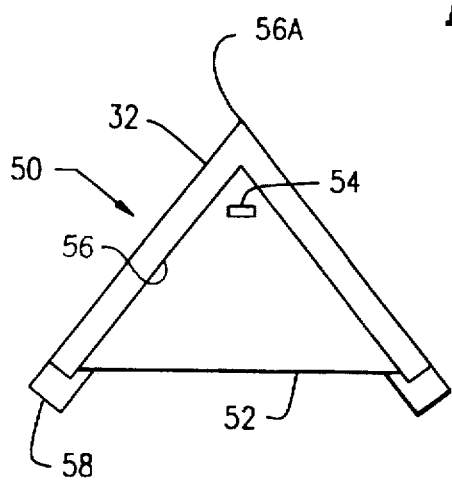
FIG. 7A is a front view of the beam splitter of the collimator assembly of FIG. 6.

Referring to FIG. 7A, there is shown a front view of the beam splitter of the collimator assembly of FIG. 6. In this embodiment 50, the base member 52 also has a hollow tent-like structure including two inclined surfaces 56. The inclined surfaces 56 extend upward merging together to also form approximately a ninety degree angle 56A. The inclined surfaces 56 extend downward forming lips 58 which extend outward in transverse direction with respect to the inclined surfaces 56. The inclined surfaces 56 along with the lips 58 support the mirror elements 32 when placed within the base 52. The lips 58 also prevent longitudinal movement of the mirror elements 32 in a similar fashion as described in the previous embodiment.

The base 52 further includes detentes 54 which are utilized to secure the beam splitter 50 to the housing. This is accomplished by disposing the detentes 54 within slots included in the housing, which will be described later in conjunction with FIG. 8.

Figure 7B:
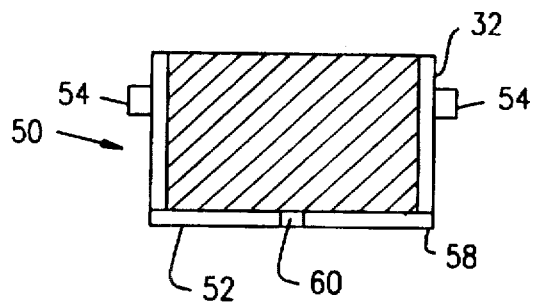
FIG. 7B is a side view of the beam splitter of the collimator assembly of FIG. 6.
Figure 7C:
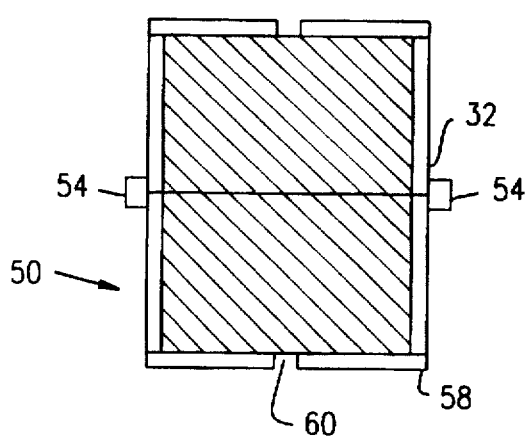
FIG. 7C is a top view of the beam splitter of the collimator assembly of FIG. 6.

Referring to FIGS. 7B & 7C, it can be seen that the detentes 54 extend outward from the sides of the base 52. Further, the lips 58 include apertures 60 which provides access to the mirror elements 32 when positioned within the base 52. This enables the mirror elements 32 to be held in place while the beam splitter 50 is secured to the housing between the flanges.

Figure 7D:
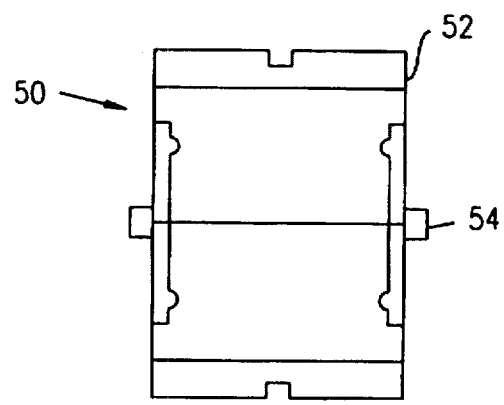
FIG. 7D is a bottom view of the beam splitter of the collimator assembly of FIG. 6.

FIG. 7D is a bottom view of the beam splitter of the collimator assembly of FIG. 6. As can be seen, the base 52 has a hollow configuration which further provides further weight and cost reductions since less material is required. As in the first embodiment, the base member 52 is also preferably fabricated from a plastic material.

Figure 8:
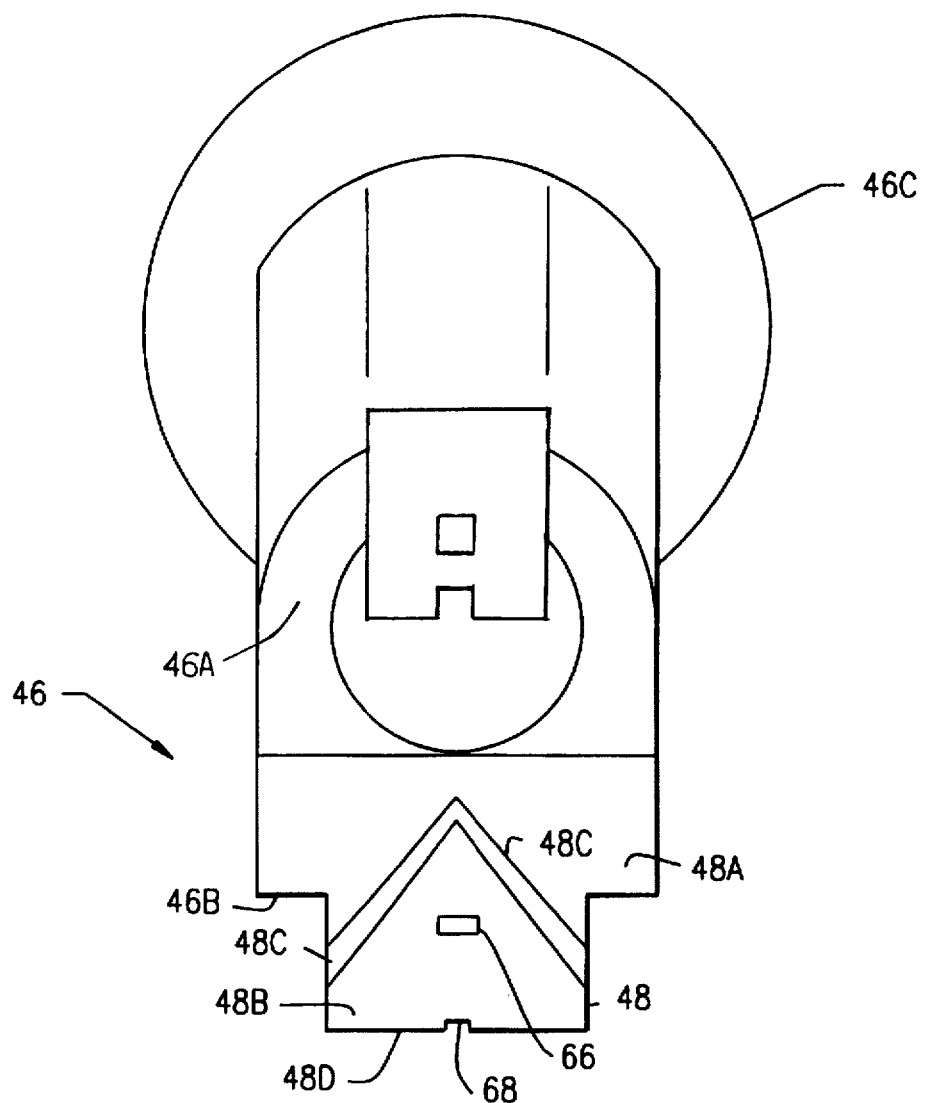
FIG. 8 is a front view of the housing of the collimator assembly of FIG. 6.

Referring to FIG. 8, a front view of the housing of the collimator assembly of FIG. 6 is shown. As can be seen, the shape of the housing 46 differs in that it is generally cylindrical with a flat surface 46B. Further, the housing 46 includes a rear portion 46C that is cylindrical and has a larger diameter than the front portion 46A. As previously described, a pair of flat flanges 48 extend outward in a substantially parallel configuration from the front portion of the housing 46A.

The flanges 48 have inner surfaces 48A which include notches 66. The notches 66 receive the previously described base detentes to secure the beam splitter to the front portion of the housing 46A. In order to accomplish this, the beam splitter is positioned between the two flanges 48 while simultaneously the base detentes are snapped in place within the respective slots 66. As a result, the beam splitter 50 is locked into place between the flanges 48 as shown in FIG. 6, due to the frictional forces between the base detentes and slots.

Still referring to FIG. 8, the inner surfaces 48A further include triangular cut outs 48B which are utilized to stabilize the beam splitter when secured within the housing 46. This is accomplished by the incline surfaces of the base contacting the vertical surfaces of the cut out 48C when the base 52 is positioned between the flanges 48 as shown in FIG. 6. Because of this configuration, a torque exerted on the base 52 would not cause it to slip out of position between the flanges 48.

Still Referring to FIG. 8, the front edges of the flanges 48D also include notches 68 utilized to remove the beam splitter when it is locked in position between the flanges 48. A flat tool such as a screw driver can be placed within one of the notches 68 and exert a force on the base which overcomes the frictional forces exerted between the base detentes and slots 66, and thus pry the beam splitter lose from between the flanges 48.

Figure 9:
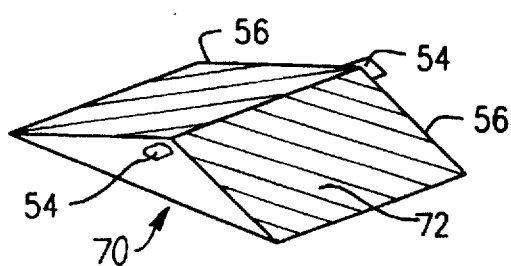
FIG. 9 is a perspective view of another embodiment of the beam splitter of the collimator assembly of FIG. 6.

Referring to FIG. 9, there is shown a perspective view of another embodiment of the beam splitter of the collimator assembly of FIG. 6. This embodiment of the beam splitter is similar to the one previously described in conjunction with FIG. 7 except that it does not have separate mirror elements. Instead of utilizing separate mirror elements, this embodiment 70 incorporates a layer of reflective material 72 which is disposed on the inclined surfaces 56 of the base member 70. The reflective material 72 utilized can include such materials as Aluminum, Silver or Chromium. This simplifies the present invention since additional elements such as the mirror elements and lips are no longer required. Thus, additional savings in cost and weight is achieved. The base 70 is also preferably fabricated from a plastic material.

While the invention has been particularly shown and described with reference to preferred embodiments thereof, it will be understood by those skilled in the art that changes in form and details may be made therein without departing from the spirit and scope of the present invention.

What is claimed is:

1. A collimator assembly of the type including a housing having optics to collimate light and a beam splitter for splitting the collimated light, wherein the improvement therewith comprising:

said beam splitter including:

a base member having a tent-like structure including two inclined surfaces;

a mirror element supported by each of said inclined surfaces, wherein said mirror elements are planar members including a layer of reflective material encased in a plastic material; and means for securing said beam splitter to said housing.

2. The assembly of claim 1, wherein said base member is hollow.

3. The assembly of claim 1, wherein said mirror elements include a bevelled edge.

4. The assembly of claim 1, wherein said inclined surfaces extend downward forming lips which further supports said mirror elements.

5. The assembly of claim 1, wherein said base member further includes side flanges for preventing lateral movement of said mirror elements.

6. The assembly of claim 5, wherein said side flanges are of a triangular configuration.

7. The assembly of claim 5, wherein said securing means includes screws which extend through bores included in said side flanges.

8. The assembly of claim 1, wherein said securing means includes flanges extending outward from a front portion of said housing, said flanges each having a notch extending therethrough and detentes extending outward from side surfaces of said base members, wherein said base member is disposed between said flanges, and said notches are disposed within said slots thereby securing said base member to said housing.

9. The assembly of claim 8, wherein said flanges include an inner surface having a triangular cut out for stabilizing said base member when secured to said housing.

10. A beam splitter device for a collimator assembly including a housing having optics to collimate light, comprising:

a base member having a tent-like structure including two inclined surfaces and side flanges for preventing lateral movement of said separate mirror elements;

a mirror element supported by each of said inclined surfaces; and means for securing said beam splitter to said housing, said securing means including screws which extend through bores included in said side flanges.

11. The device of claim 10, wherein said base member is hollow.

12. The device of claim 10, wherein said mirror elements are planar members including a layer of reflective material encased in a plastic material.

13. The assembly of claim 10, wherein said inclined surfaces extend downward forming lips which further supports said mirror elements.

14. The device of claim 10, wherein said mirror elements include a bevelled edge.

15. A beam splitter device for a collimator assembly including a housing having optics to collimate light, comprising:

a base member having a tent-like structure including two inclined surfaces;

a mirror element supported by each of said inclined surfaces; and means for securing said beam splitter to said housing;

wherein said securing means includes flanges extending outward from a front portion of said housing, said flanges each having a notch extending therethrough and detentes extending outward from side surfaces of said base members, wherein said base member is disposed between said flanges, and said notches are disposed within said slots thereby securing said base member to said housing.

16. The device of claim 15, wherein each of said flanges include an inner surface having a triangular cut out for stabilizing said base member when secured to said housing.

17. The device of claim 15, wherein said base member is hollow.

18. The device of claim 15, wherein said mirror elements are planar members including a layer of reflective material encased in a plastic material.

19. The assembly of claim 15, wherein said inclined surfaces extend downward forming lips which further supports said mirror elements.

20. The device of claim 15, wherein said mirror elements include a bevelled edge.

* * * * *